Patented Sept. 22, 1942

2,296,709

UNITED STATES PATENT OFFICE 2,296,709

OXIDATION PRODUCT OF α-TOCOPHEROL AND PROCESS OF PREPARING THE SAME

Erhard Fernholz, Princeton, N. J., assignor to Merck & Co., Inc., Rahway, N. J., a corporation of New Jersey No Drawing. Application February 26, 1938, Serial No. 192,799

2 Claims. (Cl. 260—413)

This invention relates to products derived from α-tocopherol and useful in the production of compounds related to the fertility vitamin, generally known as vitamin E.

α-tocopherol, $C_{31}H_{50}O_2$, occurs in a large number of vegetable oils and has the physiological properties of vitamin E. I have discovered that when α-tocopherol, or its esters are treated with an oxidizing agent, such as chromium trioxide, potassium permanganate, etc., many valuable products are obtained, for example dimethyl maleic anhydride, a lactone having the formula $C_{21}H_{40}O_2$, an acid having the formula $C_{16}H_{32}O_2$, and an alcohol having the formula $C_{18}H_{38}O$.

These products have valuable properties, for example the said lactone, acid and/or alcohol may be used to synthesize substances which have the physiological properties of vitamin E. The said lactone, acid, and alcohol may be synthesized and used in the further synthesis of compounds exhibiting the physiological property of vitamin E.

The following examples illustrate methods of carrying out the present invention, but it is to be understood that these examples are by way of illustration and not of limitation.

Example I 4.3 gms. of α-tocopherol are dissolved in 59 cc. of glacial acetic acid, and to this solution is added in portions at room temperature a solution of 7 gms. of chromium trioxide in 10 cc. of water and 60 cc. of acetic acid. After the addition is complete, the mixture is heated on a steam bath for ½ hour.

The acetic acid solution is diluted with water and extracted with ether. The ether is washed several times with water to remove acetic acid as far as possible and then washed with dilute sodium hydroxide to extract acidic substances. The alkali extract is acidified with hydrochloric acid and the organic acids are taken up with ether. The ether leaves behind 1.0 gm. of crystalline residue. The crystalline material is separated from oily material by sublimation at 100° C. and 0.02 mm. pressure, the receiver being cooled with solid carbon dioxide. 0.33 gm. (26%) of dimethyl maleic anhydride is thus isolated, which after recrystallization from petroleum ether has a M. P. of 94° C.

$C_6H_6O_3$ cal.: C 57.14  H 4.80
found: C 57.31  H 4.79

The material which is not extracted from the ether by the dilute sodium hydroxide treatment is boiled for an hour with 25 cc. potassium hydroxide in alcohol. The mixture turns very dark. It is diluted with water and extracted with ether. The ether leaves 0.42 gm. of a neutral residue. The alkali solution is acidified, extracted with ether, and 2.26 gms. of a lactonic fraction is obtained. The lactone has the probable formula—

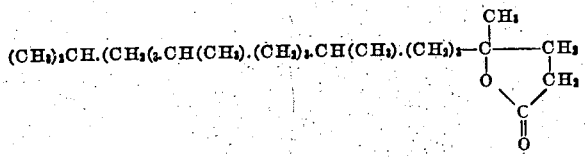

The crude lactone is distilled at a bath temperature of 170–200° C. at 0.02 mm. pressure. About 0.5 gm. of tar remains. The distillate is dissolved in 20 cc. alcohol and N sodium hydroxide added until the solution stays alkaline after heating on the steam bath for one hour. N/10 hydrochloric acid is then added to remove the color of phenol phthalein, and 1.5 gm. of benzylthiuronium chloride dissolved in hot alcohol is added. Water is then added until the solution becomes cloudy. Crystals soon begin to appear. They are filtered after the solution has been kept in the icebox for an hour. The crude salt is dried in a desiccator and upon recrystallization from acetone it is obtained with a yield of 1.6 gm. (31.4%) as white needles, M. P. 120° C. The crystals are quite soluble in hot alcohol but less soluble in acetone.

$C_{29}H_{52}O_3N_2S$ cal.: C 68.45  H 10.30  N 5.50
found: C 68.61  H 10.26  N 5.30
found: C 68.45  H 10.30  N 5.50

0.737 g. in 10 cc. absolute alcohol solution shows $\alpha_D = /0.08°$, $[\alpha]^{22}_D = +4.6°$.

The thiuronium salt is decomposed with hydrochloric acid, taken up with ether, and distilled at a bath temperature of 130° C. at 0.02 mm. pressure.

$C_{21}H_{40}O_2$ cal.: C 77.72  H 12.42
found: C 77.56  H 12.37
found: C 77.67  H 12.30

Example II

The methyl ester of the hydroxy acid may be prepared by dissolving 1.0 gm. of the lactone in 30 cc. of absolute methanol, adding 0.55 cc. of concentrated sulfuric acid, and refluxing the mixture for 2 hours. The ester is isolated by means of ether extraction and distillation (140° C./0.022 mm.)

$C_{22}H_{44}O_3$ cal.: $OCH_3$ 8.79
found: $OCH_3$ 8.88

Example III 0.78 gm. of the methyl ester is dissolved in 30 cc. of acetic acid, and a solution of 0.17 gm. of chromium trioxide (1.1 mol. of chromium trioxide to 1 mol. of ester) is added at room temperature. The next day the color of the mixture still indicates a large excess of chromium trioxide. The solution is heated on the steam bath, and after 30 min. the reaction for chromic acid is very weak. The material is divided into neutral, acidic and lactonic fractions as in Example I. The latter fraction gives 0.6 gm. of the thiuronium salt of the hydroxy acid. There are only traces of acidic degradation products.

Example IV 25 gm. of α-tocopherol allophanate are hydrolized with methyl alcoholic potassium hydroxide, and the tocopherol obtained is then acetylated by boiling it with 100 cc. of acetic anhydride for 1 hour. The acetic anhydride is decomposed with water, the acetate extracted with ether, and dissolved in 250 cc. of acetic acid. This solution is heated to boiling on an oil bath having a temperature of 140–150° C. A solution of 75 gm. of chromium trioxide in 250 cc. of water and 250 cc. of acetic acid are slowly added to the boiling solution, and the volatile substances are distilled off simultaneously. After completing the addition of chromic acid, 250 cc. of 2N sulfuric acid are dropped into the mixture, and the distillation continued. The whole procedure requires 4 hours.

The distillate (500 cc.) contains diacetyl and a product which, on hydrolysis, yields acetone.

The oxidation products remaining after distillation are isolated with ether and divided into three chief groups, acids (6.1 gm.), lactone (5.1 gm.) and neutral (2.1 gm.) in the manner described above.

Example V 6.1 gm. of the acid fraction is dissolved in alcohol and neutralized with N sodium hydroxide. A solution of 4.5 gm. of barium acetate in water is added and a barium soap comes out. The supernatant liquid is decanted after a day of standing in the icebox. The barium salt is dissolved in ether and decomposed with hydrochloric acid. The acid (4.8 gm.) is then distilled at a bath temperature of 150° C. at 0.02 mm. pressure. The distillate weighs 4.4566 gm. and is titrated with N sodium hydroxide, giving an equivalent weight of 334. A solution of 3.69 gm. of p-phenyl-phenacyl bromide in alcohol is added, and the mixture refluxed for 2 hours. The ester is extracted with ether, and washed with sodium carbonate solution. The crude ester is dissolved in 50 cc. of alcohol, and the solution cooled with solid carbon dioxide for a few days. The crystalline material is then filtered and recrystallized from the same solvent. After five recrystallizations, the ester is obtained pure with a yield of 1.53 gm. It forms leaflets, M. P. 49° C., and is fairly soluble in all organic solvents. 23.0 mg. in 2.5 cc. chloroform solution shows $$\alpha_D = -0.05°, \ [\alpha]^{24}_D = -8.7°$$

$C_{30}H_{42}O_3 =$ cal.: C 79.95 H 9.39
found: C 79.95 H 9.34
found: C 79.98 H 9.36

C-methyl determinations gave 6.55; 6.60 $CH_3$
$C_{30}H_{42}O_3$ Calc. 9.99% (3$CH_3$), 6.66 (2$CH_3$)

The acid is preferably prepared by first converting the p-phenyl-phenacyl ester into the methyl ester, and saponifying the latter with alcoholic potassium hydroxide. 5 drops of concentrated sulfuric acid are added to a solution of 0.5 gm. of ester in 30 cc. of methanol, and the mixture is refluxed for one hour. The solution is diluted with water and extracted with ether. The ether residue is digested with 30 cc. of petroleum ether, which leaves p-phenyl-benzoyl-carbinol largely undissolved. The residue is removed by filtering the solution through a layer of charcoal. The petroleum ether residue weighs 0.2895 gm.; calculated 0.311 gm. The methyl ester is then saponified with alcoholic potassium hydroxide in the usual manner, and 0.268 of an oily acid are obtained. The acid is distilled at a bath temperature of 140° C. at 0.02 mm. pressure.

$C_{16}H_{32}O_2$ cal. 256.4 found 259.1

The acid has the probable formula—

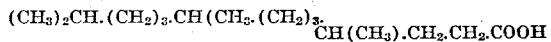

It forms an unstable, insoluble silver salt. The benzyl-thiuronium salt is easily obtainable in crystalline form, but the amide is not.

A solution of 0.2683 gm. of the acid in 10 cc. of alcohol is neutralized with N sodium hydroxide, and a solution of 0.22 gm. of benzyl-thiuronium chloride in 2 cc. of hot alcohol added. An equal volume of water is then added, and the salt crystallizes. It is recrystallized from aqueous alcohol, causing some decomposition, and from acetone. It forms small leaflets, M. P. 146° C. and is very soluble in absolute alcohol, methanol and dioxane.

$C_{24}H_{42}O_2N_2S$ cal.: C68.20 H10.01 N6.53
found: C68.30 H10.04 N6.32
found: C68.23 H10.09 N6.44

Example VI 24 gm. of neutral oxidation products are distilled at a bath temperature of 110° C. at 0.02 mm. pressure. 1 gm. of a colorless distillate is obtained. It is dissolved in 20 cc. of absolute alcohol, and hydrogenated with 2 gm. of sodium, added in portions. The products, isolated with ether, are dissolved in 30 cc. of dry pyridine, and treated on the steam bath with 2 gm. of m-dinitrobenzoyl chloride. The dinitrobenzoate, isolated by extraction with ether, is dissolved in a small amount of acetone, and some methanol added to reduce the solubility. The flask is kept in dry ice, and crystallization sets in after a few days. The dinitrobenzoate is purified by recrystallization from alcohol, and obtained as small leaflets, M. P. 101–103° C. The yield is about 1 gm.

$C_{25}H_{40}O_6N_2$ cal.: C64.63 H8.68
found: C64.55 H8.91
found: C64.74 H8.77

Upon saponification of the ester, the alcohol is obtained as a white oil. It has the probable formula—

$(CH_3)_2CH.(CH_2)_3.CH(CH_3).(CH_2)_3.CH(CH_3).(CH_2)_3.CH(OH).CH_3$

It is to be understood that whenever the compound α-tocopherol is recited in the claims, the esters of α-tocopherol are also included. Modifications may be made in carrying out this invention without departing from the spirit and scope thereof, and I am to be limited only by the appended claims.

I claim:
1. 2,6,10-trimethyl-tridecanic acid (—13).
2. Process comprising treating a substance selected from the group consisting of α-tocopherol and esters of α-tocopherol with an oxidizing agent selected from the group consisting of chromium trioxide and potassium permanganate, separating the acid fraction thus obtained, and recovering 2,6,10-trimethyl-tridecanic acid (—13) therefrom.

ERHARD FERNHOLZ.